(12) United States Patent
Hwang et al.

(10) Patent No.: US 6,391,967 B1
(45) Date of Patent: May 21, 2002

(54) FLAME RETARDING THERMOPLASTIC RESIN COMPOSITION

(75) Inventors: Kuen-Yuan Hwang; Hong-Hsing Chen; Ying-Ling Liu; Wen-Tsai Tsai, all of Hsinchu Industrial District (TW)

(73) Assignee: Chang Chun Plastics Co., Ltd. (TW)

( * ) Notice: Subject to any disclaimer, the term of this patent is extended or adjusted under 35 U.S.C. 154(b) by 0 days.

(21) Appl. No.: 09/502,620

(22) Filed: Feb. 11, 2000

(30) Foreign Application Priority Data

Oct. 27, 1999 (TW) ........................................ 88118544 A

(51) Int. Cl.⁷ .............................................. C08L 61/34
(52) U.S. Cl. ...................... 525/133; 525/138; 525/390; 525/428; 525/429; 525/442; 525/443; 525/465; 525/497; 525/500; 528/158; 528/163
(58) Field of Search .................................. 528/158, 163; 525/133, 138, 442, 465, 497, 500, 428, 390

(56) References Cited

U.S. PATENT DOCUMENTS

| | | |
|---|---|---|
| 4,278,591 A | 7/1981 | Granzow |
| 5,618,865 A | 4/1997 | Martens et al. |
| 5,733,957 A | 3/1998 | Podszum et al. |
| 5,814,690 A | 9/1998 | Penn |

FOREIGN PATENT DOCUMENTS

| | | | |
|---|---|---|---|
| EP | 0 491 986 A1 | | 7/1992 |
| EP | 0 685 518 A2 | | 12/1995 |
| JP | 58189219 | * | 11/1983 |
| JP | 7-292050 | | 11/1995 |
| JP | 9-296120 | | 11/1997 |
| JP | 10-60160 | | 3/1998 |
| JP | 10-175985 | | 6/1998 |
| JP | 10-251497 | | 9/1998 |
| JP | 11-21458 | | 1/1999 |

* cited by examiner

Primary Examiner—Patricia A. Short
(74) Attorney, Agent, or Firm—Peter F. Corless; Steven M. Jensen; Edwards & Angell, LLP

(57) ABSTRACT

This invention discloses a flame retarding thermoplastic resin composition, which is comprised of (i) a thermoplastic resin and (ii) a phenolic resin compound as a flame retardant, wherein the phenolic resin compound contains a nitrogen-containing heterocycle and phosphorus. Since the flame retarding thermoplastic resin composition of this invention does not contain halogen, and has excellent flame retardant properties and high heat resistance, it is useful in producing parts and products in the fields of electronics, electricity and automobile.

11 Claims, No Drawings

FLAME RETARDING THERMOPLASTIC RESIN COMPOSITION

FIELD OF THE INVENTION

This invention discloses a flame retarding thermoplastic resin composition, which is comprised of (i) a thermoplastic resin and (ii) a phenolic resin compound as a flame retardant, wherein the phenolic resin compound contains a nitrogen-containing heterocycle and phosphorus.

Since the flame retarding thermoplastic resin composition of this invention does not contain halogen, and has excellent flame retardant properties and high heat resistance, it is useful in producing parts and products in the fields of electronics, electricity and automobile.

The flame retarding thermoplastic resin composition of this invention does not contain halogen and diantimony trioxide. However, its flame retardant properties meet the UL94V-0 standard and it has high heat resistance. Besides, the flame retarding thermoplastic resin composition of this invention has improved the sagging property of the resin compound and solves the problem of migration of the flame retardant in the resin compound, while it retains the easy processing property and good physical properties of a thermoplastic resin.

BACKGROUND OF THE INVENTION

While thermoplastic resins are widely applied in various fields, they have the considerable defect of burning easily and falling in droplets when in contact with fire. In order to overcome this problem, generally, a flame retardant is added into the thermoplastic resin to improve its resistance to fire. But, the burning of the additive cause additional problems. For example, if the added flame retardant contains halides such as bromides, toxic smoke and gases are released when burning or at high temperatures. Especially, highly toxic polybromofurans and polybromodioxins are produced when burning the brominated aromatic compounds, and will seriously affect the health of humans and the environment. Even if they are not burned, both the recovery and the treatment of the waste material from large amounts of these flame retardants will all cause problems as far as the environment is concerned. Therefore, the development of a flame retardant not containing halogen is eagerly required for the thermoplastic resins.

Among the halogen-free flame retardant system being currently developed, the phosphorus and the nitrogen flame retardant systems drew the most attention. With regard to phosphorus compounds as the flame retardant of a thermoplastic resin, it is known that EP 491,986, EP 685,518 and U.S. Pat. No. 5,733,957 disclose an aromatic phosphate oligomer which is used as a flame retardant; JP-A-Hei-10-60160 discloses an aromatic phosphate oligomer which is used as a flame retardant, in coordination with other flame retardants or flame retardant auxiliaries such as silicon compounds; JP-A-Hei-10-251497, JP-A-Hei-11-21458 and U.S. Pat. No. 5,733,957 disclose red phosphorus and phosphate compounds as flame retardants, respectively; in addition, JP-A-Hei-7-292050 discloses using phosphate compounds such as phenolics as flame retardants. As well, U.S. Pat. No. 4,278,591 and U.S. Pat. No. 5,618,865 disclose using nitrogen compounds derived from melamines as the flame retardant of a thermoplastic resin. Further, there are more flame retardant systems of the thermoplastic resin which are comprised of phosphorus compounds in combination with nitrogen compounds, used to reinforce the flame retarding effect, and improve thermal and melt processing properties. These are all exemplified as in the disclosed U.S. Pat. No. 5,814,690, JP-A-Hei-10-175985 and JP-A-Hei-9-296120.

The present inventors have made extensive studies on increasing the flame retarding properties of a thermoplastic resin, while maintaining or improving its processing, physical and mechanical properties. Thus they have devised a novel thermoplastic resin not containing halogen and completed this invention.

DETAILED DESCRIPTION OF THE INVENTION

This invention discloses a flame retarding thermoplastic resin composition, which is comprised of (i) a thermoplastic resin and (ii) a phenolic resin compound as a flame retardant, wherein the phenolic resin compound contains a nitrogen-containing heterocycle and phosphorus.

The term "thermoplastic resin" in this invention means a resin which is flowable after heating and can then be processed and molded. The specific examples of the thermoplastic resins include polyesters such as polyethylene terephthalate (PET), polybutylene terephthalate (PBT), liquid crystalline polyesters, aromatic polyesters, polycarbonates, polyamides, aromatic polyamides, polyimides, polystyrenes, polyphenyl ethers, polyether sulfones, polysulfones, acrylonitrile-butadiene-styrene (ABS) copolymers, and the like. These resins can be used alone or two or more of them can be mixed.

The phenolic resin compound used as a flame retardant in the flame retarding thermoplastic composition of this invention, which contains a nitrogen-containing heterocycle and phosphorus, is characterized as having the following repeating units:

(a)

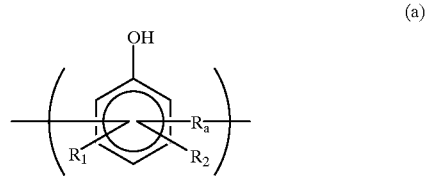

wherein $R_1$ and $R_2$ may be the same or different and independently represent H, a $C_{1-20}$alkyl group, a phenoxy group, a phenyl-$C_{1-4}$alkyl group or a phenyl-$C_{1-4}$alkyl group where a hydroxy group is substituted on the benzene ring, and $R_a$ represents a single bond, a phenylene group which may be substituted with a $C_{1-4}$alkyl group,

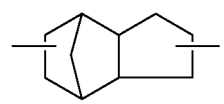

or —C($R_3$)H—, wherein $R_3$ represents H, a $C_{1-4}$alkyl group, $CH_2$=CH—, phenyl, furanyl, a $C_{1-4}$alkyl-phenyl group or a $C_{1-4}$alkyl-phenyl group where a hydroxy group is substituted on the benzene ring;

(b) a phosphorus-containing repeating unit which is selected from any one of the following formula (b1) or (b2):

(b1)

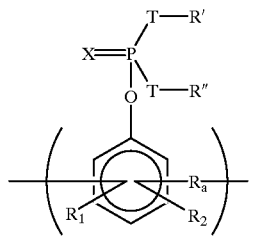

wherein $R_1$, $R_2$ and $R_a$ are defined as above,
X represents an oxygen atom or an ion pair,
T represents an oxygen atom or a chemical linkage, and
R' and R" may be the same or different and independently represent a $C_{1-18}$alkyl group, phenyl and a phenyl-$C_{1-6}$alkyl group, or R' and R" can be combined together, so that

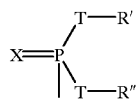

represents

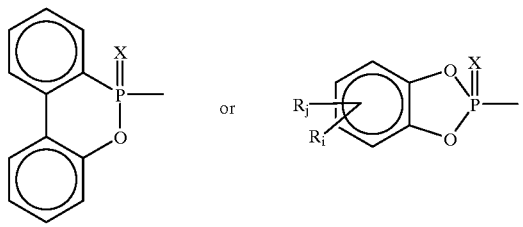

wherein $R_i$ and $R_j$ may be the same or different and independently represent a hydrogen atom or a $C_{1-18}$alkyl group; or (b2)

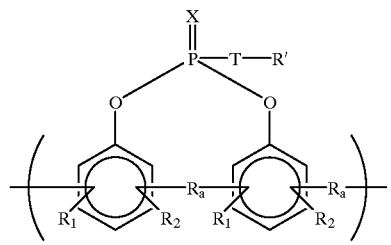

wherein each symbol is defined as above; and (c)

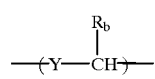

wherein $R_b$ represents H, a $C_{1-4}$alkyl group, $CH_2=CH-$, phenyl, furanyl, a $C_{1-4}$alkyl-phenyl group or a $C_{1-4}$alkyl-phenyl group where a hydroxy group is substituted on the benzene ring, and Y represents

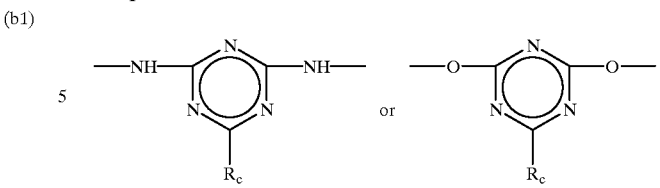

wherein $R_c$ represents $NH_2$, OH, a $C_{1-10}$alkyl group, phenyl or benzoyl.

Examples of the $C_{1-4}$alkyl group of "a $C_{1-4}$alkyl group", "a $C_{1-4}$alkyl-phenyl group" or "a $C_{1-4}$alkyl-phenyl group wherein a hydroxy group is substituted on the benzene ring" represented by $R_a$ and $R_b$ include, for example, methyl, ethyl, n-propyl, isopropyl, n-butyl, s-butyl, t-butyl, and the like.

Examples of the $C_{1-6}$ alkyl group of "a phenyl-$C_{1-6}$alkyl group" represented by R' and R" include those exemplified above for a $C_{1-4}$alkyl group, and pentyl, hexyl, and the like.

Examples of a $C_{1-10}$alkyl group represented by $R_c$ include those exemplified above for a $C_{1-6}$alkyl group, and heptyl, octyl, nonyl, decyl, and the like.

Examples of a $C_{1-18}$alkyl group represented by R' and R" include those exemplified above for a $C_{1-10}$alkyl group, and undecyl, dodecyl, tridecyl, tetradecyl, pentadecyl, hexadecyl, heptadecyl, octadecyl, and the like.

Examples of a $C_{1-20}$alkyl group represented by $R_1$ and $R_2$ include those exemplified above for a $C_{1-18}$alkyl group, and nondecyl, eicosyl, and the like.

The repeating unit (a) of the phosphorus-containing polymer having phenolic units of this invention is derived from phenolic resins, such as phenolic resin, phenyl phenolic resin, cresol phenolic resin, xylenol phenolic resin, phenol phenolic resin, isobutylphenol phenolic resin, nonylphenol phenolic resin, bisphenol A phenolic resin, bisphenol F phenolic resin, bisphenol phenolic resin, melamine phenolic resin and polyhydric phenols having the following repeating unit:

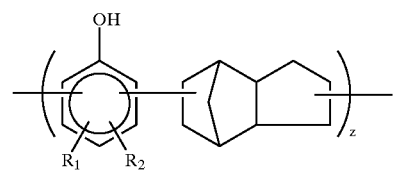

wherein $R_1$ and $R_2$ are defined as above, and z is an integer from 1 to 10.

The repeating unit (b1) of the phenolic resin compound (which contains a nitrogen-containing heterocycle and phosphorus) of this invention, is derived from the products of reacting the above-mentioned phenolic resin compound with a phosphorus-containing compound of the following formula:

(I)

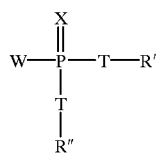

wherein W represents a halogen atom or OR'" (where R'" represents a alkyl group, an aryl group or an aralkyl group), and other symbols are defined as above.

The repeating unit (b2) of the phenolic resin compound (which contains a nitrogen-containing heterocycle and phosphorus) of this invention, is derived from the products of reacting the above-mentioned phenolic resin compound with a phosphorus-containing compound of the following formula:

(II)

wherein each symbol is defined as above.

The repeating unit (c) of the phenolic resin compound (which contains a nitrogen-containing heterocycle and phosphorus) of this invention is derived from melamines, cyanuric acids and guanamines such as benzoguanamine, and the like.

Those phosphorus-containing compounds represented by the above-mentioned formula (I) wherein W represents a halogen atom only, can be represented by the following formula:

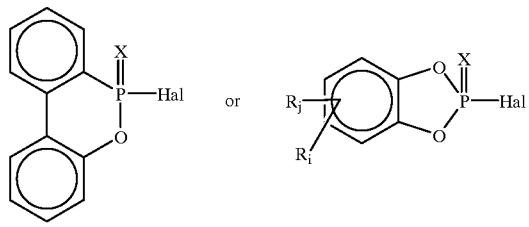

wherein Hal represents a halogen atom and other symbols are defined as above.

The phenolic resin compound used as a flame retardant in this invention, which contains a nitrogen-containing heterocycle and phosphorus, can be produced by reacting the above-mentioned phenolic resin with at least one compound selected from the group consisting of melamines, cyanuric acids and guanamines, to form a phenolic polymer which contains a nitrogen-containing heterocycle, then reacting the obtained phenolic polymer with a phosphorus-containing compound represented by formula (I) or (II).

The above-mentioned reaction of the phenolic resin with at least one compound selected from the group consisting of melamines, cyanuric acids and guanamines is a well-known reaction in the field of polymers, and is not necessary to be described again herein.

As for the reaction of the obtained phenolic polymer, which contains a nitrogen-containing heterocycle, with a phosphorus-containing compound represented by formula (I) or (II), the following two methods are described:

Method A): Esterification method [when W represents a halogen atom in a phosphorus-containing compound represented by formula (I) or (II)]:

The reaction of the phenolic polymer, which contains a nitrogen-containing heterocycle, with a phosphorus-containing compound represented by formula (I) or (II) is carried out at a temperature of 100 to 300° C., preferably 120 to 260° C., under a reacting pressure of 0.1 to 760 mmHg, preferably 0.1 to 100 mmHg, for 0.5 to 20 hours, preferably 1 to 15 hours.

In the above reaction, 0.1 to 20 moles, and preferably 0.5 to 15 moles, of the hydroxy group of the phenolic resin are used, relative to 1 mole of the reacting functional group (i.e., W group) of the phosphorus-containing compound.

The above reaction may be carried out with or without a catalyst. However, the addition of a catalyst can effectively increase the reaction rate. The examples of the suitable catalysts include, for example, aluminum chloride, magnesium chloride, aluminum hydroxide, magnesium hydroxide, lead (I) chloride, and the like.

The amount of the catalyst used is 0.001 to 5 weight % of the total weight of the reactants.

The above reaction may be carried out in a solvent or without a solvent. Any solvent can be employed, provided that it does not adversely affect the reaction. The examples of the solvents which can be used are toluene, xylene, vinyl acetate, tetrahydrofuran, and the like.

Method B): Ester exchange Method [when W represents OR''' in a phosphorus-containing compound represented by formula (I) or (II)]:

The reaction of the phenolic polymer, which contains a nitrogen-containing heterocycle, with a phosphorus-containing compound represented by formula (I) or (II) is carried out at a temperature of 100 to 300° C., preferably 120 to 260° C., under a reacting pressure of 0.1 to 600 mmHg, preferably 0.1 to 100 mmHg, for 0.5 to 20 hours, preferably 1 to 15 hours.

In the above reaction, 0.1 to 20 moles, and preferably 0.5 to 15 moles, of the hydroxy group of the phenolic resin are used, relative to 1 mole of the reacting functional group (i.e., W group) of the phosphorus-containing compound.

The above reaction may be carried out with or without a catalyst. However, the addition of a catalyst can effectively increase the reaction rate. The examples of the suitable catalysts include, for example, aluminum chloride, magnesium chloride, lead (I) chloride, triethylamine, titanium tetrabutoxide, sodium carbonate, potassium carbonate, zinc acetate, and the like.

The amount of the catalyst used is 0.001 to 5 weight % of the total weight of the reactants.

The above reaction may be carried out in a solvent or without a solvent. Any solvent can be employed, provided that it does not adversely affect the reaction. The examples of the solvents which can be used are toluene, xylene, vinyl acetate, tetrahydrofuran, and the like.

In the flame retarding thermoplastic resin composition of this invention, the amount of the phenolic resin compound (ii) used as the flame retardant, which contains a nitrogen-containing heterocycle, is 1 to 100 parts by weight preferably 2 to 85 parts by weight, and more preferably 5 to 70 parts by weight, relative to 100 parts by weight of the thermoplastic resin (i).

If too small an amount of the phenolic resin compound (ii) of this invention is added, the desired flame retarding properties cannot be attained; on the other hand, if too large an amount is added, the molded processing and physical properties are adversely affected.

In addition to the phenolic resin compound (ii) of this invention, other well-known flame retardants not containing halogen may also be added into the flame retarding thermoplastic resin composition of this invention. The examples include melamine phosphate, ammonium polyphosphate, cyanuric acid-melamine complex and a phosphorus-containing compound represented by the following formula:

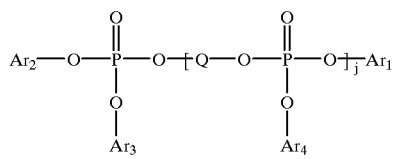

wherein j is an integer of from 0 to 10, $Ar_1$, $Ar_2$, $Ar_3$ and $Ar_4$ may be the same or different and independently represent phenyl, hydroxyphenyl, a substituted phenyl or a substituted hydroxyphenyl; Q represents an un-substituted or substituted phenylene or biphenylene, or a group of the following formula:

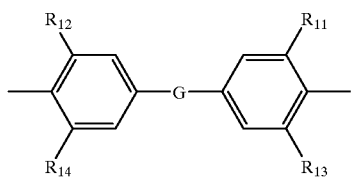

wherein G represents —O—, —S—, —SO$_2$—, C(CH$_3$)$_2$—, —CH$_2$— or —CH(ph)—, and $R_{11}$, $R_{12}$, $R_{13}$ and $R_{14}$ may be the same or different and independently represent a hydrogen atom or a $C_{1-4}$alkyl group.

A metallic oxide or a metallic hydroxide may also be added in the flame retarding thermoplastic resin composition of this invention, to further enhance its flame retardant properties. The examples include aluminum oxide, magnesium oxide, magnesium hydroxide, aluminum hydroxide, lead (I) hydroxide, and the like.

The amount of the metallic oxide or metallic hydroxide used is 0 to 100 parts by weight, preferably 0.1 to 80 parts by weight, and more preferably 2 to 70 parts by weight, relative to 100 parts by weight of the flame retarding thermoplastic resin composition of this invention.

In the flame retarding thermoplastic resin composition of this invention, the conventional additives generally used in a thermoplastic resin composition can be added, provided that they do not contain halogen. Such additives include, for example, thermal stabilizer, antioxidant, UV absorbent, plasticizer, parting agent, dye, pigment, coloring agent, and the like.

For the purpose of enhancing the mechanical strength and rigidity of the flame retarding thermoplastic resin composition of this invention, fibrous or granular inorganic filling materials, such as glass fiber, glass sheet glass beads, carbon fiber, metallic fiber, aramide fiber, barium sulfate, mica, talc powder and the like, can be added.

The flame retarding thermoplastic resin composition of this invention can be used to produce electronic/electrical parts and products such as connectors, relays, switches, casing material, transformer material, coil material, etc., and parts/products in the fields of electronics, medical machinery, automobile, mechanical machine and the like, by well-known molding methods such as blow molding, extrusion molding, press molding and the like.

This invention will be further described with reference to the following Examples, but the scope of this invention is by no means limited.

The following commercially available products are used in the following

EXAMPLES

Phosphorus-containing compound A: sold under trade name Phosflex TPP and manufactured by Akzo Nobel Chemical Company, having the following structure:

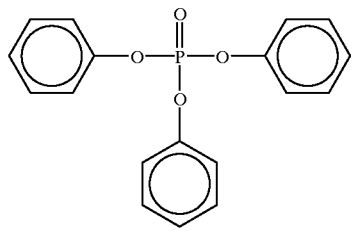

Phosphorus-containing compound B: sold under trade name Phosflex CDP and manufactured by Akzo Nobel Chemical Company, having the following structure:

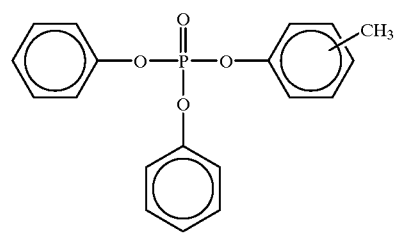

Phosphorus-containing compound C: sold under trade name FP-600 and manufactured by Asahi Denka Industrial Company, having the following structure:

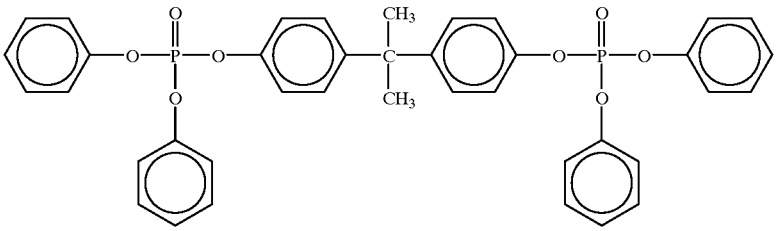

Synthesis Example 1

Synthesis of Phenolic Resin A Which Contains a Nitrogen-containing Heterocycle and Phosphorus Phenol (470 g), 37.4% aqueous solution (200 g) of formaldehyde, water (174 g), triethylamine (3.8 g) and melamine (50 g) were added into a 3-liter, 4-necked reacting vessel equipped with temperature and pressure-controlling and indicating apparatuses. The reaction was performed at 80° C. for 2 hours. Then, the temperature was raised to 120° C., and the reaction was performed for another 1 hour. The unreacted phenol and water were recovered, and a phenolic resin which contains a nitrogen-containing heterocycle was obtained.

The above obtained phenolic resin which contains a nitrogen-containing heterocycle (500 g), phosphorus-containing compound A (750 g) and anhydrous magnesium chloride (1.6 g) were added into a 3-liter, 4-necked reacting vessel equipped with temperature and pressure-controlling and indicating apparatuses. The temperature was raised to 200° C. and the pressure was reduced to 1 mmHg. After the reaction was carried out for 6 hours, the phenolic resin A which contains a nitrogen-containing heterocycle and phosphorus was obtained. The content of phosphorus thereof was 6.8 weight % and the content of nitrogen was 4.5 weight %.

Synthesis Example 2

Synthesis of Phenolic Resin B Which Contains a Nitrogen-containing Heterocycle and Phosphorus The same process was carried out as in Synthesis Example 1, except that melamine was replaced by benzoquanamine, and phosphorus-containing compound A was replaced by phosphorus-containing compound B. As a result, the phenolic resin B which contains a nitrogen-containing heterocycle and phosphorus was obtained.

Working Examples 1 to 6 and Comparative Examples 1 to 4

The components listed in Table 1 were mixed in the listed amounts, and molten-kneaded at 260° C. in an extruder, to obtain various thermoplastic resin compositions of Working Examples 1 to 6 and Comparative Examples 1 to 4. The flame retarding properties, the heat deflection temperatures and migration test of a flame retardant of these obtained compositions were determined. The results are shown in Table 1.

TABLE 1

| | Constituents of Thermoplastic Resin | | | Results | | |
|---|---|---|---|---|---|---|
| | Thermoplastic Resin (100 parts by wt.) | P-containing Compound (parts by wt.) | | Flame Retarding Property UL94 | Heat Deflection Temperature (° C.) | Migration of Flame Retardant Ratio of Surface Phosphorus Amount (Before/After Heat Treatment) |
| Working Example 1 | PBT[1] | A-25 | | V-0 | 60 | 1.00 |
| Working Example 2 | PBT[1] | B-25 | | V-0 | 59 | 1.01 |
| Working Example 3 | PBT[1] | A-15 | C-15 | V-0 | 60 | 1.35 |
| Working Example 4 | PC[2] | A-25 | | V-0 | 134 | 1.01 |
| Working Example 5 | PC[2]/ABS[3] (75/25 by wt.) | A-25 | | V-0 | 98 | 1.00 |
| Working Example 6 | PC[2]/ABS[3] (75/25 by wt.) | B-25 | | V-0 | 101 | 1.00 |
| Comparative Example 1 | PBT[1] | — | A-30 | V-0 | 55 | 2.00 |
| Comparative Example 2 | PC[2] | — | B-30 | V-0 | 131 | 1.85 |
| Comparative Example 3 | PC[2]/ABS[3] (75/25 by wt.) | — | A-30 | V-0 | 86 | 1.85 |
| Comparative Example 4 | PC[2]/ABS[3] (75/25 by wt.) | — | — | Burning | 86 | — |

Note:
[1]PBT: Polybutylene terephthalate, sold under trade name PBT 1100-2116, and manufactured by Chang Chun Plastics Co., Ltd., Taiwan, IV-0.94 dl/g.
[2]PC: Bisphenol type polycarbonate, sold under trade name EIPILON S-200, and manufactured by Mitsubishi Engineering Plastics Co. Ltd., Japan.
[3]ABS: Acrylonitrile-butadiene-styrene copolymers, sold under trade name TOYOLAK-500, and manufactured by Toray Company, Japan.
[4]Flame retarding properties: The test was performed in accordance with UL-94 method.
[5]Heat deflection temperature: A sample was prepared and determined under a loading of 1.82, in accordance with ASTM-638.
[6]Migration of a flame retardant: After a sample sheet was processed in an oven at 100° C., the amount of phosphorus on the surface of the sample sheet was determined.

What is claimed is:

1. A flame retarding thermoplastic resin composition, which is comprised of (i) a thermoplastic resin and (ii) a phenolic resin compound as a flame retardant, wherein the phenolic resin compound contains a nitrogen-containing heterocycle and phosphorus and is characterized as having the following repeating units:

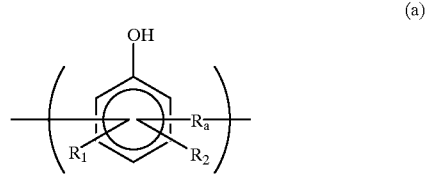

(a)

wherein $R_1$ and $R_2$ may be the same or different and independently represent H, a $C_{1-20}$alkyl group, a phenoxy group, a phenyl-$C_{1-4}$alkyl group or a phenyl-$C_{1-4}$alkyl group where a hydroxy group is substituted on the benzene ring, and $R_a$ represents a single bond, a phenylene group which may be substituted with a $C_{1-4}$alkyl group,

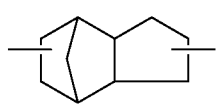

or —C($R_3$)H—, wherein $R_3$ represents H, a $C_{1-4}$alkyl group, $CH_2$=CH—, phenyl, furanyl, a $C_{1-4}$alkyl-phenyl group or a $C_{1-4}$alkyl-phenyl group where a hydroxy group is substituted on the benzene ring;

(b) a phosphorus-containing repeating unit which is selected from any one of the following formula (b1) or (b2):

(b1)

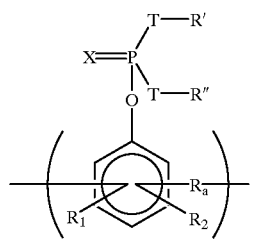

wherein $R_1$, $R_2$ and $R_a$ are defined as above,

X represents an oxygen atom or an ion pair,

T represents an oxygen atom or a chemical linkage, and

R' and R" may be the same or different and independently represent a $C_{1-18}$alkyl group, phenyl and a phenyl-$C_{1-6}$alkyl group, or R' and R" can be combined together, so that

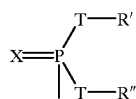

represents

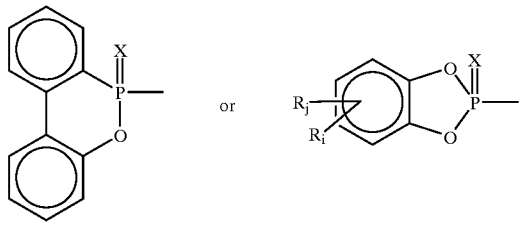

wherein $R_i$ and $R_j$ may be the same or different and independently represent a hydrogen atom or a $C_{1-18}$alkyl group; or (b2)

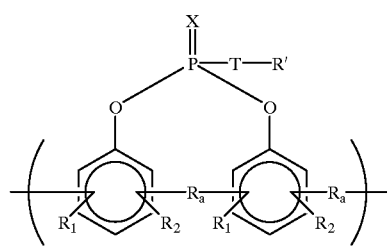

wherein each symbol is defined as above; and (c)

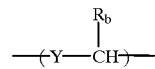

wherein $R_b$ represents H, a $C_{1-4}$alkyl group, $CH_2$=CH—, phenyl, furanyl, a $C_{1-4}$alkyl-phenyl group or a $C_{1-4}$alkyl-phenyl group where a hydroxy group is substituted on the benzene ring, and Y represents

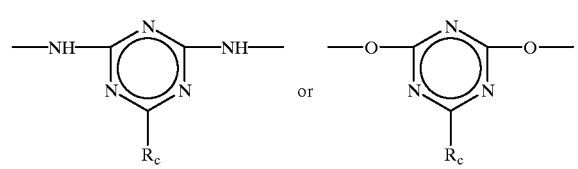

wherein $R_c$ represents $NH_2$, OH, a $C_{1-10}$alkyl group, phenyl or benzoyl.

2. The composition according to claim 1, wherein 1 to 100 parts by weight of said phenolic resin compound (ii) is used relative to 100 parts by weight of said thermoplastic resin (i).

3. The composition according to claim 1, wherein said thermoplastic resin is selected from the group consisting of polyesters, liquid crystalline polyesters, aromatic polyesters, polycarbonates, polyamides, aromatic polyamides, polyimides, polystyrenes, polyphenyl ethers, polyether sulfones, polysulfones and acrylonitrile-butadiene-styrene copolymers.

4. The composition according to claim 1, which further contains other flame retardants not containing halogen.

5. The composition according to claim 1, which further contains fibrous or granular inorganic filling materials.

6. The composition according to claim 1, wherein said thermoplastic resin is a polyester.

7. The composition according to claim 6, wherein said polyester compound is polybutylene terephthalate and/or polyethylene terephthalate.

8. The composition according to claim 1, wherein said thermoplastic resin is a polycarbonate.

9. The composition according to claim 1, wherein said thermoplastic resin is an acrylonitrile-butadiene-styrene copolymer.

10. The composition according to claim 1, wherein said thermoplastic resin is a mixture of polycarbonates and acrylonitrile-butadiene-styrene copolymers.

11. The composition according to claim 1, which is used to produce parts and products in the fields of electricity, electronics, medical machinery, automobile and mechanical machine.

* * * * *